United States Patent [19]
Antonshenkov

[11] Patent Number: 5,875,445
[45] Date of Patent: Feb. 23, 1999

[54] PERFORMANCE-RELATED ESTIMATION USING PSEUDO-RANKED TREES

[75] Inventor: Gennady Antonshenkov, deceased, late of Amherst, N.H., by Victoria Antonshenkov, executrix

[73] Assignee: Oracle Corporation, Redwood Shores, Calif.

[21] Appl. No.: 865,374

[22] Filed: May 29, 1997

[51] Int. Cl.[6] .................................................. G06F 17/30
[52] U.S. Cl. ........................ 707/2; 707/1; 707/3; 707/4; 707/9; 707/101; 707/102
[58] Field of Search ................................. 707/101, 3, 2, 707/102, 1, 9, 4

[56] References Cited

U.S. PATENT DOCUMENTS

| | | | |
|---|---|---|---|
| 5,251,131 | 10/1993 | Masand et al. ........................ | 707/101 |
| 5,412,806 | 5/1995 | Du et al. ..................................... | 707/2 |
| 5,671,403 | 9/1997 | Shekita et al. .............................. | 707/2 |
| 5,765,150 | 6/1998 | Burrows ...................................... | 707/3 |

Primary Examiner—Paul R. Lintz
Assistant Examiner—Thu-Thao Havan
Attorney, Agent, or Firm—McDermott, Will & Emery

[57] ABSTRACT

A method and system for estimating a cost of using a tree index to process a query that includes at least one interval restriction is provided. The cost of using an index to process a select query is estimated by (1) classifying intervals covered by the index as either true, false, or mixed intervals, based on the selection criteria, (2) estimating the cost of using the index based on the size of the true and mixed intervals, and (3) improving the cost estimate based on the average ratio of the parent and child node cardinalities taken down one or more sampling paths of the index. Use of a pseudo-ranked B-tree is generally preferred over a fully ranked tree due to the relatively low update costs of a pseudo-ranked B-tree. The index cost estimations are used to pick a select query execution plan that has the smallest cost, in terms of disk I/O operations, from numerous possible execution plans.

32 Claims, 7 Drawing Sheets

PERFORMANCE-RELATED ESTIMATION USING PSEUDO-RANKED TREES

FIELD OF THE INVENTION

The present invention relates to indexes, and more specifically, to techniques for estimating the cost of using an index.

BACKGROUND OF THE INVENTION

Relational databases store information in indexed tables. A user retrieves information from the tables by entering input that is converted to queries by a database application. The database application submits the queries to a database server. In response to a query, the database server accesses the tables specified in the query to determine which information within the tables satisfies the queries. The information that satisfies the queries is then retrieved by the database server and transmitted to the database application and ultimately to the user.

For any given database application, the queries must conform to the rules of a particular query language. Most query languages provide users with a variety of ways to specify information to be retrieved. For example, in the Structured Query Language (SQL), the following query requests the retrieval of the information contained in all rows of a table "t1":

SELECT * FROM t1

The user may constrain the query to retrieve a smaller amount of information by adding a WHERE clause, as in the following query:

SELECT * FROM t1

WHERE c1=2 AND c2>5 AND c3=8

The WHERE clause imposes a constraint that each row of table t1 must meet to satisfy the query. In this case, the WHERE clause has three predicates, c1=2, c2 >5, and c3=8. These predicates mean that all the retrieved rows of table t1 must have a value equal to two in column c1, a value greater than five in column c2, and a value equal to eight in column c3, respectively.

Without special processing, a database server would have to fetch every row of a table and inspect every column named in the WHERE clause to perform the query. However, such an approach impairs the overall database system performance because many disk blocks would have to be read. As a result, many database systems provide indexes to increase the speed of the data retrieval process. A database index is similar to a normal index found at the end of a book, in that both kinds of indexes comprise an ordered list of information accompanied with the location of the information. Values from one or more columns of a table are stored in an index, maintained separately from the actual database table.

Referring to FIG. 1A, it illustrates a portion of a table 100 and a portion of a B-tree 108 associated with table 100. Table 100 has a plurality of rows 105A–105D, and a plurality of columns 102A–102N. Each table in a database system also has an internal column, or pseudocolumn, referred to as rowid. A table's rowid pseudocolumn is not displayed when the table's structure is listed. However, it is retrievable by a query and can be used to uniquely identify a row in the table. Rowid column 103 has rowid entries that correspond to the rows 105A–105D. Column 102N of table 100 stores names.

A B-tree consists of a set of nodes connected in a hierarchical arrangement. A B-tree contains two types of nodes: branch nodes and leaf nodes. Leaf nodes reside at the lowest level of the hierarchy and contain values from the actual column to which the index corresponds. For example, B-tree 108 is an index for column 102N of table 100. Node 134 of B-tree 108 is a leaf node that contains values from column 102N. Along with the values, leaf nodes store the rowid of the rows that contain the values. For example, in addition to the names Issacs, leaf node 134 contains the rowid 4876 that corresponds to the row 105A of table 100 that contains the name Issacs in column 102N.

All the nodes in B-tree 108 that are not leaf nodes are branch nodes. Branch nodes contain data that indicates a interval of values. In the illustrated B-Tree 108, nodes 110, 112, 114, 116, 120, 122, 124, 132 and 136 are branch nodes, and therefore correspond to intervals of values. The interval of values identified in each branch node is such that all nodes that reside below a given branch node correspond to values that fall within the interval of values represented by the branch node. For example, node 114 is a branch node that corresponds to names in the alphabetic interval from Franklin to Miner. Consequently, nodes 120, 122, 124, 132, 134, and 136 which all reside below node 114 in the hierarchy, correspond to values that fall within the interval of Franklin to Miner. Reference numerals 118, 126, 128, 130, 138 and 140 represent connections to other portions of B-Tree 108 that are not shown.

To search for a value within an indexed column, a database system traverses the B-tree associated with the column. The steps for traversing a B-tree are illustrated in FIG. 1B. Referring to FIG. 1B, at step 150 the highest node in the B-tree hierarchy is established as the current node. For the purposes of illustration, it shall be assumed that a search is being performed for the name "Iverson" in column 102N. Therefore, the highest node of the B-Tree that corresponds to column 102N (node 110) shall be established as the current node at step 150. The value for which a search is being performed shall be referred to hereafter as the "target value". In the present example, "Iverson" is the target value.

At step 152, it is determined whether the target value falls within the interval associated with the highest node. In the illustrated example, the target name "Iverson" falls within the interval "Abbey" to "Zachary" associated with the highest node 110. Therefore control passes to step 158. If the target value did not fall within the interval associated with the highest node, then the target value does not reside in the column associated with the B-Tree 108 and control would pass to step 154.

At step 158, the nodes that reside directly below the current node are inspected to determine the next current node. The next current node is the node below the current node that represents the interval in which the target value resides. In the present example, nodes 112, 114 and 116 reside below the current node 110. Node 114 corresponds to the interval "Franklin" to "Miner", in which the target name "Iverson" resides. Therefore, node 114 is established as the new current node.

At step 160, it is determined whether the current node is a leaf node. In the present example, node 114 is not a leaf node so control passes back to step 158.

At step 158, nodes 120, 122, and 124 which reside directly below the current node 114 are inspected. Node 122 is selected as the next current node because the target name "Iverson" resides within the interval "Hamilton" to "Jones"

associated with node 122. At step 160 it is determined that the current node 122 is not a leaf node so control passes back to step 158. At step 158, nodes 132, 134, and 136 are inspected, and node 134 is selected as the next current node because the target name "Iverson" falls within the interval of names contained within node 134.

At step 160, it is determined that the current node 134 is a leaf node and control passes to step 162. At step 162, it is determined whether the current leaf node 134 contains the target value. In the present example, the name "Iverson" is contained in leaf node 134, so control passes to step 156. If the current leaf node does not contain the target value, control passes to step 154 where a signal indicating that the value was not found is generated.

At step 156, a signal is generated indicating that the target value was found within the index, and the rowid associated with the value is also returned. In the illustrated example, the rowid associated with the name "Iverson" is 10005.

For any given query, there may be many indexes which may be used to process the query. For example, assume that a database server receives query:

SELECT * FROM t1

WHERE c1=2 AND c2>5 AND c3=8

Assume further that the server has an index built on column c1, an index built on column c2, an index built on column c3, an index built on columns c1,c2 and an index built on columns c3,c4. The database server could select any set of zero or more of these indexes to process the query. However, the efficiency of the query processing may vary greatly based on which indexes are selected.

For example, if all values in column c2 are less than 5, then using an index built on c2 to process the query would generate a significant amount of overhead without any reduction in the number of rows that must be inspected. On the other hand, there may be only one row that contains the value 8 in column c3. Consequently, use of the index built on column c3 will greatly reduce the number of rows that need to be inspected.

Just as the benefit achieved by using a set of indexes will vary based on the set of indexes selected, so will the cost of using the indexes. Each index node visited during the use of an index generally corresponds to an I/O operation. Therefore, the cost of using an index may be measured as the number of index nodes visited during the use of the index plus the number of I/O operations required to retrieve the rows associated with the rowids returned by the index. In the worst case scenario, each data segment that must be retrieved from the database is stored on a separate page, requiring one I/O operation per data segment. Assume this worst case scenario, the cost of using an index may be computed by the formula:

Cost=rowids+leaves+height where

"Cost" is the cost of using the index;

"rowids" is the number of rowids that will be returned by the index based on the search criteria;

"leaves" is the number of leaf nodes that will be visited during the use of the index; and "height" is the height of the tree.

Referring to FIG. 2, it illustrates a tree index 200 built on a column "col" of a table "t" (not shown). Assume that a database server receives the query:

Select * from t

Where col>"bb"

And col<"ga".

Assume also that the database server uses index 200 to process the query. Initially, the database server traverses the index 200 based on the lower bound value "bb". During the traversal, the database server retrieves the root node 202 and follows a link to node 204. Node 204 is retrieved, and the database server follows a link from node 204 to arrive at leaf node 206.

Leaf node 206 is retrieved and inspected to determine that index entry 212 satisfies the search criteria. The database server follows a link from leaf node 206 to the subsequent leaf node 208. Leaf node 208 is retrieved and inspected to determine that entries 214, 216 and 218 satisfy the search criteria. The database server then follows a link from leaf node 208 to the subsequent leaf node 210.

Leaf node 210 is retrieved and inspected to determine that entry 220 satisfies the search criteria, but that other entries in the leaf node 210 are beyond the end boundary of the search criteria. Because the end boundary of the only interval in the search criteria has been reached, the traversal of index 200 is completed. The database server then retrieves the rows indicated by the entries 212–220 that satisfied the criteria.

In the above example, "rowids" is equal to five, since five rowids are returned by the index, "leaves" is equal to three, since three leaf nodes 206, 208 and 210 were retrieved during the index traversal, and "height" is equal to two, since two branch nodes 202 and 204 were retrieved before arriving at a leaf node. Consequently, the total cost of using index 200 in the present example is nine (5+3 +2).

The cost of using an index to process a particular query may accurately be calculated as the index is used to process the query. However, it is desirable to know the cost of using an index before using an index in order to determine whether the index should in fact be used. To assist the database server in the selection of indexes to process a query, techniques have been developed for estimating the cost of using an index to process a particular query.

Of the various components that comprise the cost of using an index, the most difficult component to estimate without actually processing a query is the number of rowids that will be returned based on the search criteria. The "leaves" component of the cost may be estimated by dividing the number of rowids that satisfy the search criteria by the average number of rowids entries in a leaf node. The "height" component of the cost is relatively easy to determine.

One approach to estimating how many rowids will be returned by an index in response to a particular query requires the storage and maintenance of statistical data for each index. The statistical data may include, for example, table cardinalities, index cardinalities, frequencies of distinct attribute values, lowest/highest attribute values, etc. The statistical information for an index is examined in light of interval restrictions specified in a query to determine an estimate of the number of rowids that will satisfy the query. Unfortunately, the statistical data must be refreshed with each or nearly each data update. The overhead associated with maintaining accurate statistical data can often outweigh the benefits achieved by using more efficient indexes to process a query.

Another approach to estimating how many entries of an index will satisfy a particular query uses histograms. Specifically, information about data distribution of index keys and table attributes is collected periodically in the form of histograms or maintained dynamically as approximate distribution functions. Unfortunately, intervals specified in a query are often small and fall far below the histogram/function granularity. In addition, data distribution, after Boolean restrictions are applied, cannot be modeled at all by such "restriction-independent" estimators.

Based on the foregoing, it is clearly desirable to provide a mechanism for determining which indexes should be used to most efficiently process a query. It is further desirable to provide a mechanism for estimating the cost of using an index that does not require an excessive amount of overhead. It is further desirable to provide a relatively low-overhead mechanism for estimating the number of rowids that will be returned by an index in response to interval criteria specified in a query.

SUMMARY OF THE INVENTION

A method and system for estimating a cost of using a pseudo-ranked tree index to process a query that includes at least one interval restriction is provided. The tree index is traversed to a node that has a first branch associated with a first interval into which a first endpoint of the interval restriction falls, and a second branch associated with a second interval into which a second endpoint of the interval restriction falls.

A first set of weight values associated with the first branch, the second branch, and any intervening branches that reside between the first branch and the second branch are read. The first set of weight values represent statistics about information stored in the tree index below the first branch, the second branch, and any intervening branches. The cost of using the tree index is estimated based on the first set of weight values.

To increase the accuracy of the estimate, a second set of weight values associated with branches below the node may be gathered by sampling the index tree below the node. A correction factor is generated based on the second set of weight values. The first set of weight values are adjusted based on the correction factor to produce a corrected set of weight values, and the cost of using the tree index is estimated based on the corrected set of weight values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining the cost associated with using an index to process a query is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 5:
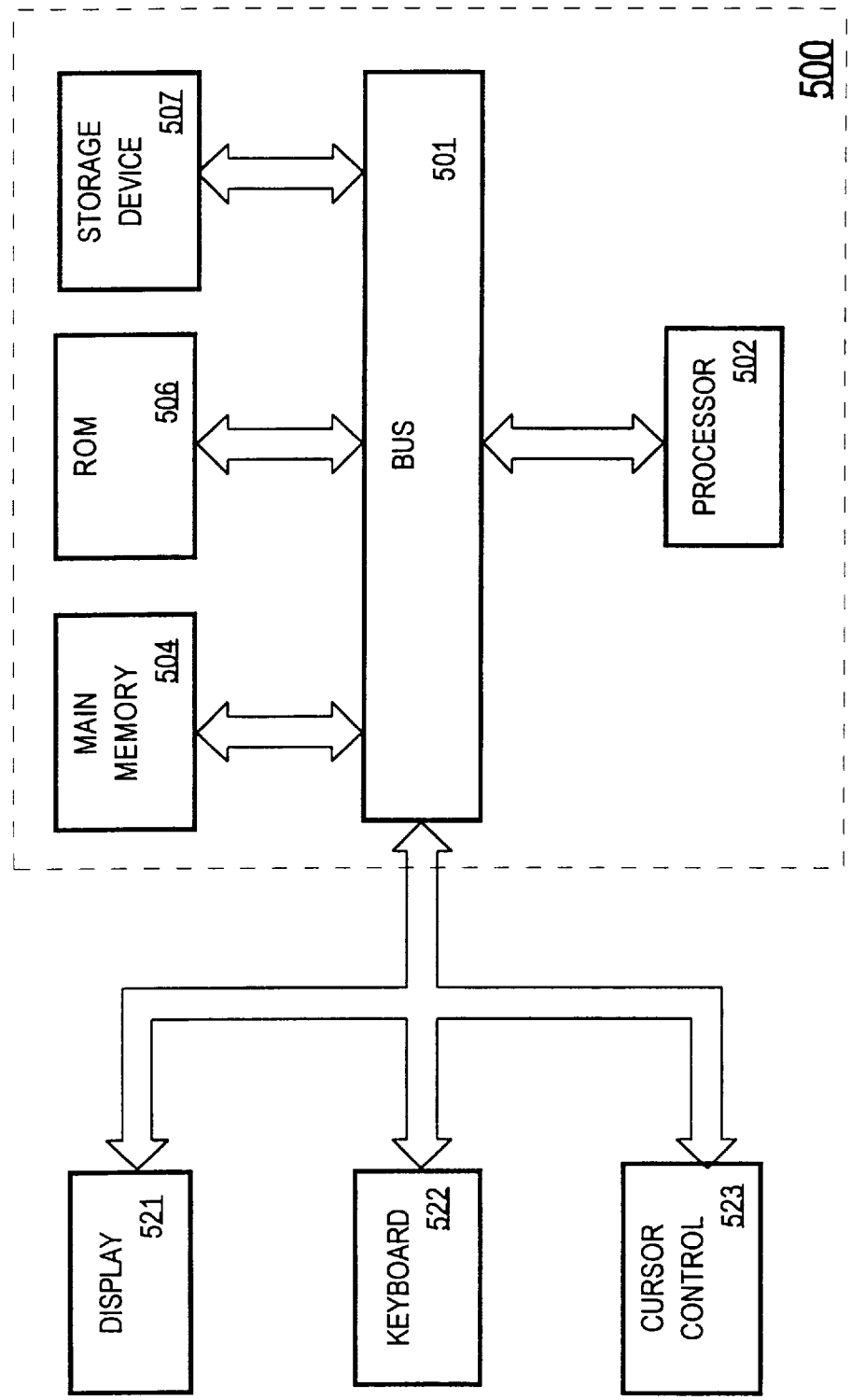
FIG. 5 is a block diagram of a computer system that may be used to implement the present invention.

Referring to FIG. 5, it is a block diagram of a computer system 500 upon which an embodiment of the present invention can be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502. Data storage device 507 is coupled to bus 501 for storing information and instructions.

A data storage device 507 such as a magnetic disk or optical disk and its corresponding disk drive can be coupled to computer system 500. Computer system 500 can also be coupled via bus 501 to a display device 521, such as a cathode ray tube (CRT), for displaying information to a computer user. Computer system 500 further includes a keyboard 522 and a cursor control 523, such as a mouse.

The present invention is related to the use of computer system 500 to determine the cost associated with using an index to process a query. According to one embodiment, cost estimation is performed by computer system 500 in response to processor 502 executing sequences of instructions contained in memory 504. Such instructions may be read into memory 504 from another computer-readable medium, such as data storage device 507. Execution of the sequences of instructions contained in memory 504 causes processor 502 to perform the process steps that will be described hereafter. In alternative embodiments, hard-wired circuitry may be used in place of or in combination with software instructions to implement the present invention. Thus, the present invention is not limited to any specific combination of hardware circuitry and software.

Ranked Trees

Figure 1A:
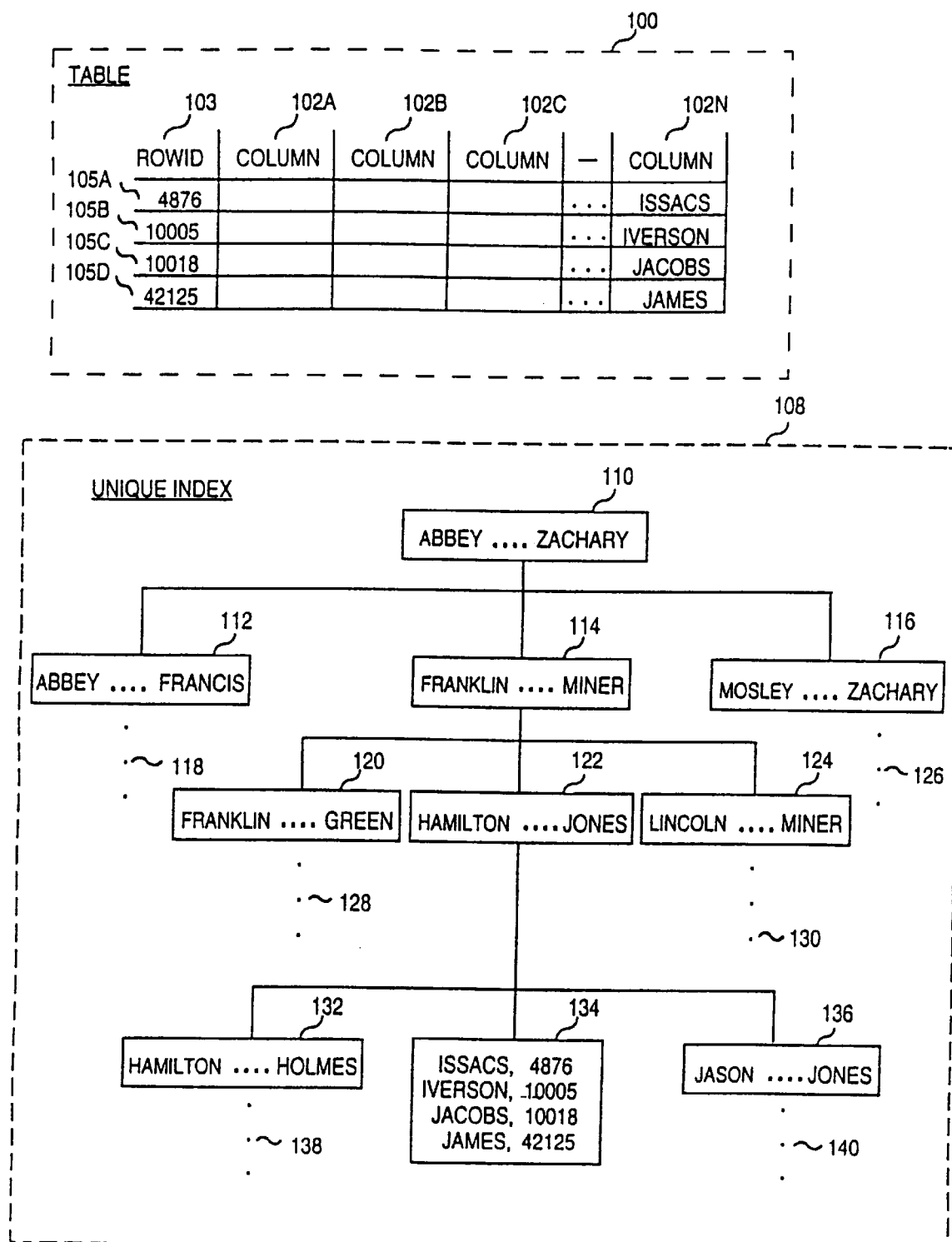
FIG. 1A is a block diagram of a B-tree and its associated table.
Figure 1B:
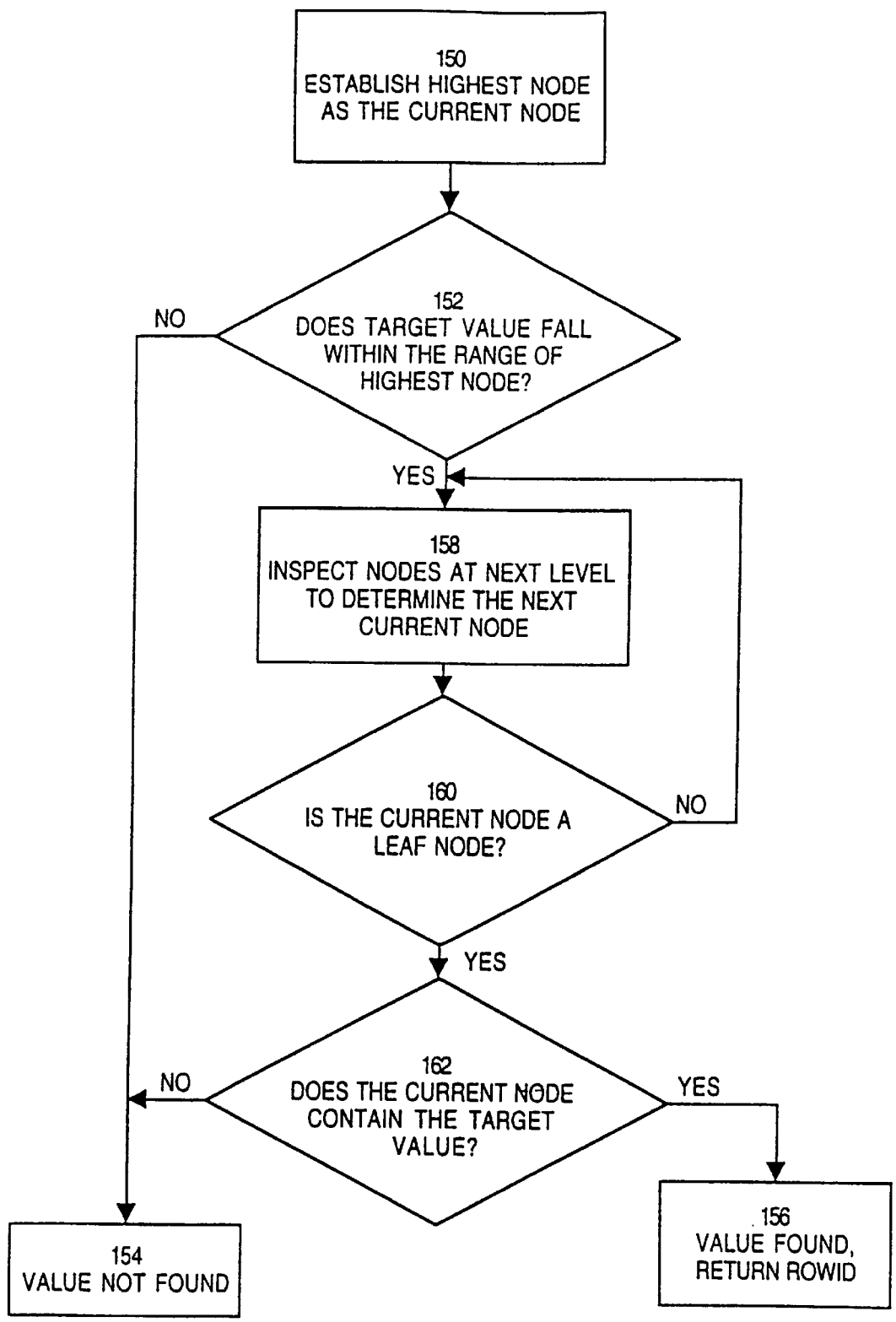
FIG. 1B is a flow chart illustrating the step for traversing a B-tree.
Figure 2:
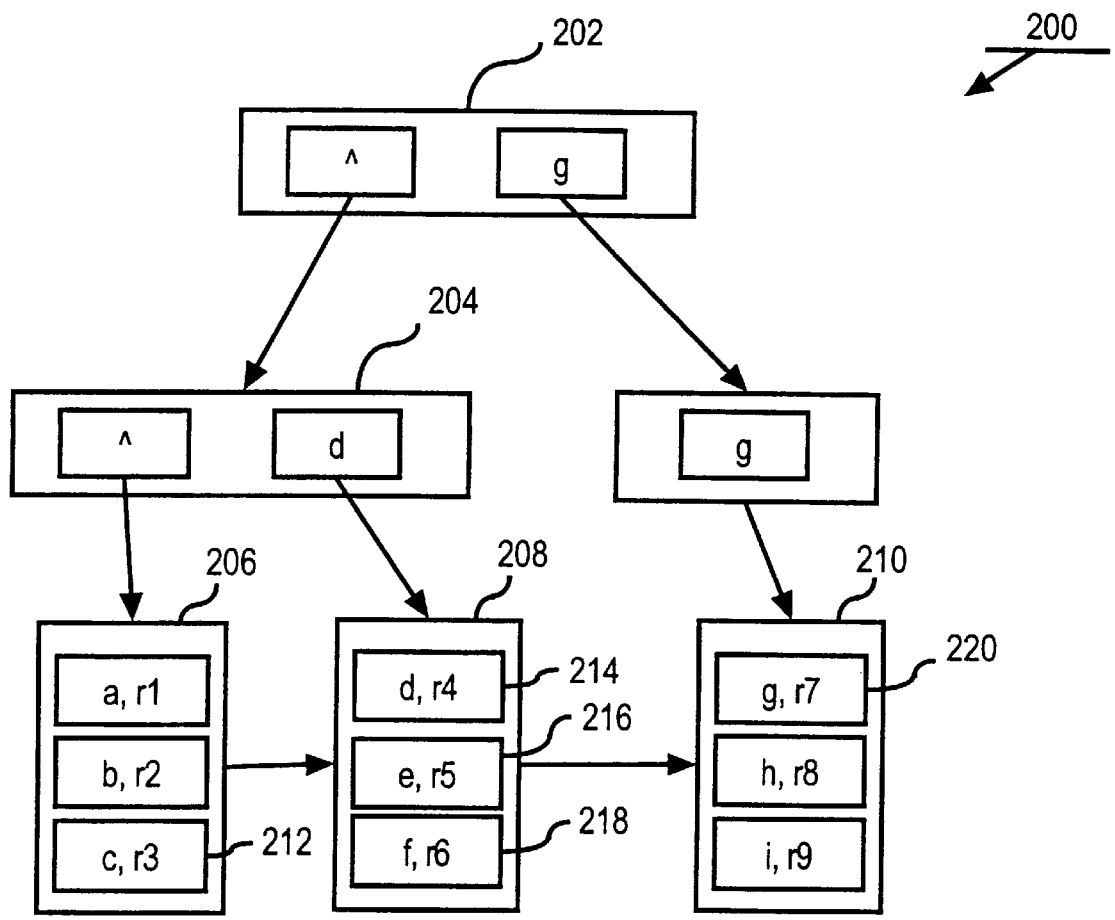
FIG. 2 is a block diagram of an exemplary tree index.
Figure 3:
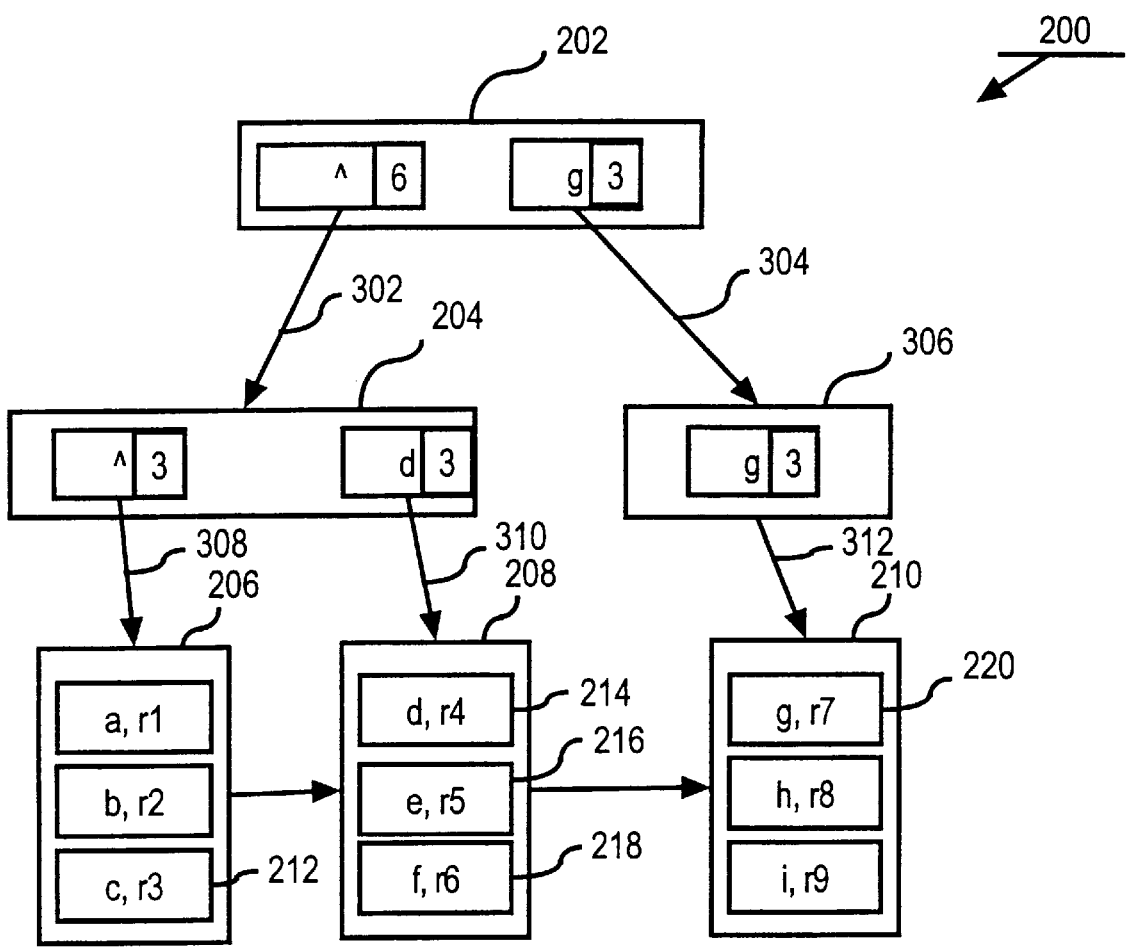
FIG. 3 is a block diagram of index shown in FIG. 2 that has been converted into a fully ranked tree.

One technique for estimating the cost of using an index requires the index to be maintained as a ranked tree. A ranked tree is a tree index in which a weight value is maintained for each branch within the tree. The weight value for a given branch identifies the number of rowids stored in leaf nodes below that branch. FIG. 3 illustrates the tree index 200 of FIG. 2 as a ranked tree.

Referring to FIG. 3, the branches 302 and 304 between node 202 and nodes 204 and 306 have weight values of six and three, respectively. Branches 308 and 310 between node 204 and leaf nodes 206 and 208 have weights of three. Branch 312 between node 306 and leaf node 210 also has a weight of three.

Cost Estimation Using Ranked Trees

According to an embodiment of the invention, the cost of using a ranked tree index to process a particular query is estimated without actually using the index to process the query. Specifically, the endpoints of the interval of key values that satisfies the search criteria (the "target interval") are identified. In the present example, "bb" and "ga" are the endpoints of the target interval.

Once the endpoints of the target interval are identified, the tree index 200 is traversed based on the endpoints. However, rather than traversing the tree index 200 all of the way down to a leaf node, the traversal is stopped at a branch node that "splits" the endpoints. A branch node is said to split the endpoints of a target interval if the values of the endpoints fall into the intervals associated with different branches from the branch node. In the present example, branch node 202 splits the endpoints "bb" and "ga" because the value "bb" falls into the interval [^, "g") associated with branch 302, and the value "ga" falls into the interval ["g", ∞] associated with branch 304. The branch node that splits the endpoints for a given interval is referred to herein as the "splitting node" for the interval.

When a splitting node is encountered, the weight values stored in the splitting node may be used to estimate the number of rowids that would be returned by the index in response to the query. The weight values associated with each branch extending from a splitting node are treated differently depending on whether the interval associated with the branch (1) is contained within the target interval, (2) falls outside the target interval, or (3) overlaps with but is not fully contained within the target interval.

Specifically, if the interval associated with a branch is contained within the target interval, the interval is said to be "contained" and the weight associated with the branch is added to the estimated number of rowids that will be returned by the index. If the interval associated with a branch falls outside the target interval, the interval is said to be "excluded" and the weight associated with the branch is not added to the estimated number of rowids that will be returned by the index. If the interval associated with the branch overlaps with but is not fully contained within the target interval, the interval is said to be "partially contained", and the weight associated with the branch is processed using a rule of thumb.

For example, one possible rule of thumb is to assume that half of the rowids that reside below a branch associated with a partially contained interval will actually satisfy the query. Therefore, the half of the weight of a branch associated with a partially contained interval will be added to the estimated number of rowids that will be returned by the index. According to one embodiment of the invention, the rule of thumb is "tunable". Thus, weights of partially contained intervals may be counted the same as the weights of contained intervals, may be ignored like the weights of excluded intervals, or may be counted after being reduced by some percentage.

In the present example, it is not certain how many of the six entries below branch 302 satisfy the search criteria, since the interval [^, "g") may contain entries both in and out of the target interval. Likewise, it is not certain how many of the three entries below branch 304 satisfy the search criteria, since the interval ["g", ∞] associated with branch 304 may contain entries both in and out of the target interval. Therefore, the weights associated with branches 302 and 304 are divided by two, and then summed to generate an estimate of the number of rowids that will be returned by index 200. In the present example, the estimated index will be 4.5 (6/2+3/2).

To increase the accuracy of an estimate, nodes below a splitting node may be inspected. For example, assume that nodes 204 and 306 are used to generate an estimate of the number of rowids that will be returned by index 200. Based on the values contained in nodes 202, 204 and 306, it is known that branch 308 leads to index entries for key values in the interval [^, "d"), that branch 310 leads to index entries for the key values in the interval [d, g), and that branch 312 leads to index entries for the key values in the interval ["g", ∞).

All of the values in the interval ["d", "g") fall into the target interval ("bb", "ga"). Therefore, it is known that the three index entries below branch 310 will satisfy the search criteria. However, the other two intervals [^, "d") and ["g", ∞) are partially contained intervals. Consequently, using nodes 204 and 306, the estimated number of rowids within index 200 that would be returned based on the search criteria would be six entries (3/2+3+3/2). In general, the deeper the traversal into a ranked tree, the more accurate a resulting cost estimate will be. However, the deeper the traversal, the higher the cost of determining an estimate.

One disadvantage of using an index cost estimation technique that requires indexes to be ranked trees is that there is a high overhead cost associated with maintaining accurate weight values for every branch node. Specifically, every time a leaf node is created or deleted the weight values of all branch nodes above the affected leaf node must be updated. The cost of maintaining ranked trees is often so high that it more than offsets the efficiency gained by using the weight information to select the best set of indexes to process a particular query.

Pseudo-Ranked Trees

A pseudo-ranked tree is similar to a ranked tree except that the weight values associated with the branch nodes are estimates of the number of rowids stored below the branch nodes, rather than the precise numbers. When an operation adds or deletes rowids stored in the leaf nodes of pseudo-ranked trees, or when leaf nodes are split or merged, the weight values of all of the branch nodes above the affected leaf node(s) do not necessarily have to be updated. Instead, a certain degree of error is allowed between the weights within a node and the weights within the nodes that are below the node.

When an operation affects the number of rowids in a leaf node, a check is made to determine whether the operation caused the weight estimate of a parent of the affected leaf node to differ from the actual number of rowids by a predetermined error bound. If the error bound is exceeded, the weight of the parent node is updated, and the checking and updating process is escalated up the tree.

The use and maintenance of a pseudo-ranked index are described in U.S. Pat. No. 5,379,422 issued on Jan. 3, 1995 to Antoshenkov, the contents of which are incorporated herein by reference. In the '422 patent, the weights stored in the branch nodes represent the number of leaf nodes below a given branch node, and are used for performing a random sampling of the index.

Figure 4:
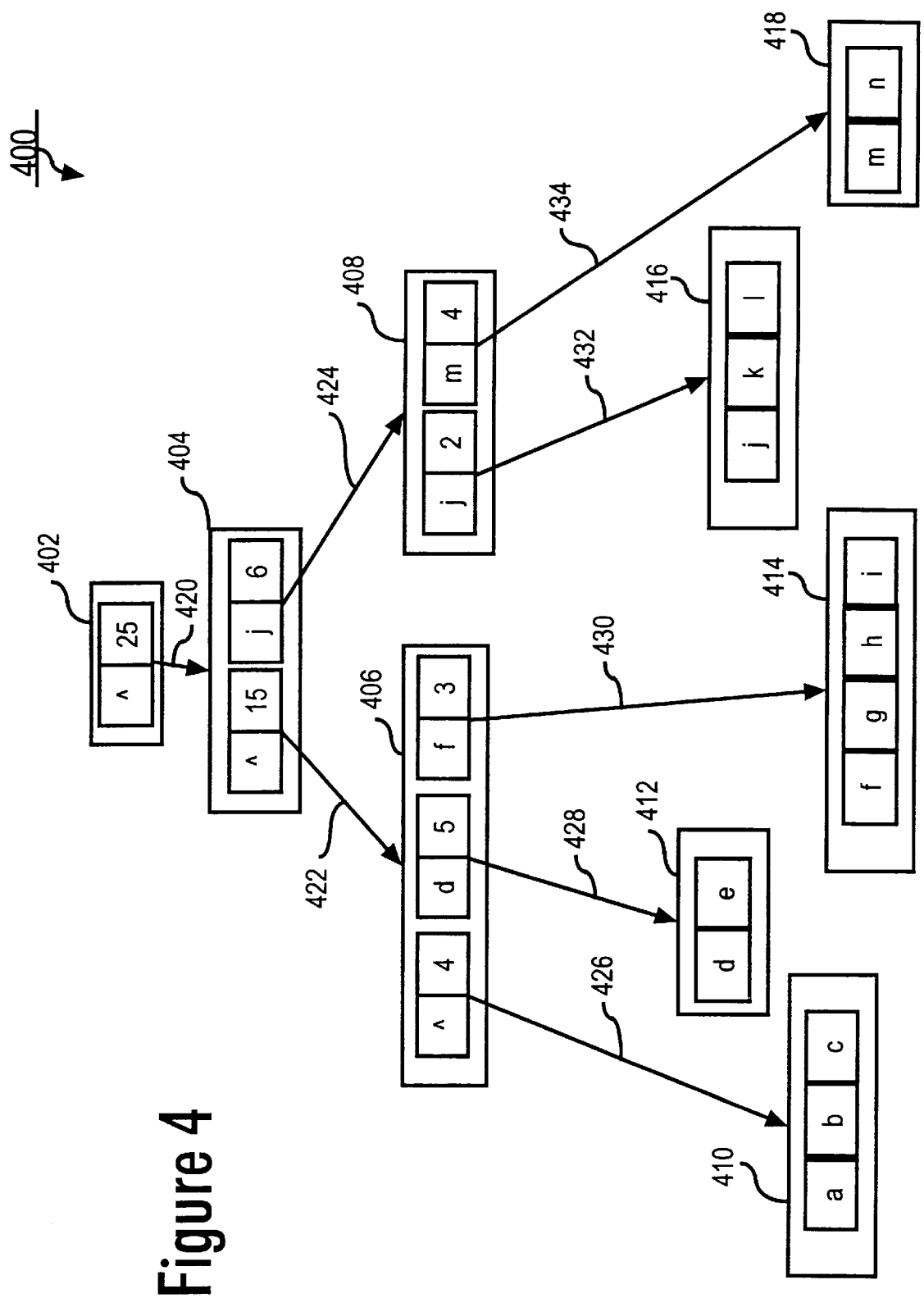
FIG. 4 is a block diagram of an exemplary pseudo-ranked tree.

FIG. 4 illustrates an exemplary pseudo-ranked tree 400. Pseudo-ranked tree 400 includes a plurality of branch nodes 402, 404, 406 and 408 and a plurality of leaf nodes 410, 412, 414, 416 and 418. The various nodes of tree 400 are connected by branches 420–434. Similar to ranked trees, pseudo-ranked tree 400 has a weight value associated with each branch. However, unlike ranked trees, the weight value is only an approximation of the number of rowids that reside below the particular branch. For example, branch 428 has a weight of five, yet the leaf node 412 below branch 428 only contains two rowids.

Unfortunately, the imprecision of the weights in pseudo-ranked trees makes pseudo-ranked trees unsuitable for conventional cost estimation techniques. Due to the nature of a pseudo-ranked tree, the weights at the higher nodes may reflect cumulative errors that deviate significantly from the actual number of rowids that the weights are meant to represent. Consequently, the higher up in an index tree that a splitting node resides, the less accurate the weight information. If a cost estimate is determined based on weight values that have a high degree of error, the cost estimate will not accurately reflect the cost of using the tree index. The inaccuracy in the cost estimate may lead to the selection of tree indexes that do not efficiently process a given query.

Pseudo-Ranked Tree Estimate Corrections

According to an embodiment of the invention, weight values within splitting nodes of pseudo-ranked trees are used to estimate the cost of using a tree index. However, to increase the accuracy of the weights, estimate correction techniques are applied before using the weights to estimate the cost of using the index.

In general, the estimate correction techniques used by embodiments of the invention involve adjusting the weights in a higher node based on the deviation between those weights and weights read from a subset of the nodes that are below the node. Because the weights from the nodes that reside below the node are less likely to reflect a cumulative error, the correction made to the weights in the higher node tends to reduce any cumulative error reflected in the weights within the higher node. The weights from the nodes below the higher node are retrieved through a process referred to as "sampling".

Specifically, one or more "samples" of the pseudo-ranked tree are taken below the splitting node for each target interval in a query. A sample of a pseudo-ranked tree index is taken for a given target interval by traversing the pseudo-ranked tree index below the splitting node along a path that corresponds to values that fall within the target interval. For example, if the target interval is "bb" to "ga", then the path defined by branches 420, 422 and 428 may be traversed to sample the target interval, since all of the index entries below branch 428 have key value that falls within the target interval.

During a sampling operation, the database server gathers weight information from the nodes that are visited during the traversal. The weight information is used to determine a "correction ratio" for each traversed branch. Specifically, the correction ratio of a branch is the ratio of the weight associated with a branch to the sum of the weights stored in the node to which the branch points. The correction ratios of the branches traversed during the sampling operation are multiplied together to produce a "correction factor". The correction factor is then used to adjust the weights used to estimate the cost of using the tree index to process a particular query.

Exemplary Sampling Operation

Assume that a sample of the target interval "bb" to "ga" is taken by traversing tree index 400 down to leaf node 412. The sampling operation begins at the root node 402. The weight associated with branch 420 (i.e. 25) is read from node 402. Branch 420 is then followed to node 404.

The weights of all of the branches that lead from node 404 are read from node 404. In the present example, branches 422 and 424 lead from node 404 and have a combined weight of 21. Branch 420 has a weight of 25. Using this information, the correction ratio associated with branch 420 is determined to be 25/21. Branch 422 is then followed to node 406.

The weights of all of the branches that lead from node 406 are read from node 406. In the present example, branches 426, 428 and 430 lead from node 406 and have a combined weight of 12. Branch 422 has a weight of 15. Using this information, the correction ratio associated with branch 422 is determined to be 15/12. Branch 428 is then followed to node 412.

Node 412 is a leaf node, and therefore does not have any branches. Therefore, rather than read the weights of branches from node 412, the number of rowids in node 412 are counted. In the present example, node 412 has two entries. Branch 428 has a weight of 5. Using this information, the correction ratio associated with branch 428 is determined to be 5/2.

Having arrived at a leaf node, the sampling operation is completed. The correction ratios determined during the sampling operation are then multiplied together to generate a correction factor. In the present example, the correction factor equals (5/2 * 15/12 * 25/21), or approximately 3.72.

The correction factor is taken to represent the ratio between the weights in the node at which the sampling was initiated, and the weights in the nodes at which the sampling was concluded. After a sampling is performed, the weights in the node at which the sampling was initiated may be divided by the correction factor to generate corrected weights that are less likely to reflect a cumulative error. In the present example, the weight (25) in node 402 may be divided by the correction factor 3.72 to yield 6.72. The actual number of rowids below node 402 is 14. 6.72 is therefore a more accurate estimate of the number of rowids below node 402 than the weight (25) stored in node 402.

In the exemplary sampling operation described above, a correction factor was generated based on one sample that descended all of the way down to a leaf node. However, more than one sampling may be used to increase the accuracy of the correction faction. For example, a second sampling may be taken down the path consisting of branches 420, 422, and 430. The correction factor generated based on this sampling path will be (4/3 * 15/12 * 25/21), or approximately 1.98. The average of the two correction factors is approximately 2.85. The weight (25) in node 402 divided by 2.85 yields a corrected weight of 8.77, which is an even more accurate estimate of 14.

Further, a sample need not descend all of the way to a leaf node. For example, the database server may have a limited I/O budget for estimating the cost of using a particular index. If the retrieval of branch nodes consumes that budget before a leaf node has been reached, a correction factor is generated based on the correction ratios that have been determined up to that point. For example, a correction factor based on a sampling that stops at node 406 would be (15/12 * 25/16), or approximately 1.95. Dividing 25 by 1.95 yields a corrected weight of 12.8.

Sampling Path Selection

According to one embodiment of the invention, each sampling path used to generate a connection ratio is randomly selected using a random number generator. Specifically, the weights of the branches that extend from a branch node are summed to generate a value N. A random number generator is then used to generate a random number R between 1 and N. The sampling then proceeds down the branch associated with the Rth index entry below the node.

For example, the sum of the weights of the branches extending from branch node 406 is 12. Therefore, to determine which of branches 426, 428 and 430 are to be descended during a sampling, a random number is generated between 1 and 12. If the random number generated is between 1 and 4, then the sampling proceeds down branch 426. If the random number generated is between 5 and 9, then the sampling proceeds down branch 428. If the random number generated is between 10 and 12, then the sampling proceeds down branch 430. This process is repeated each at each branch node that is visited during a sampling operation.

Exemplary Steps for Estimating Cost to Use an Index

Figure 6:
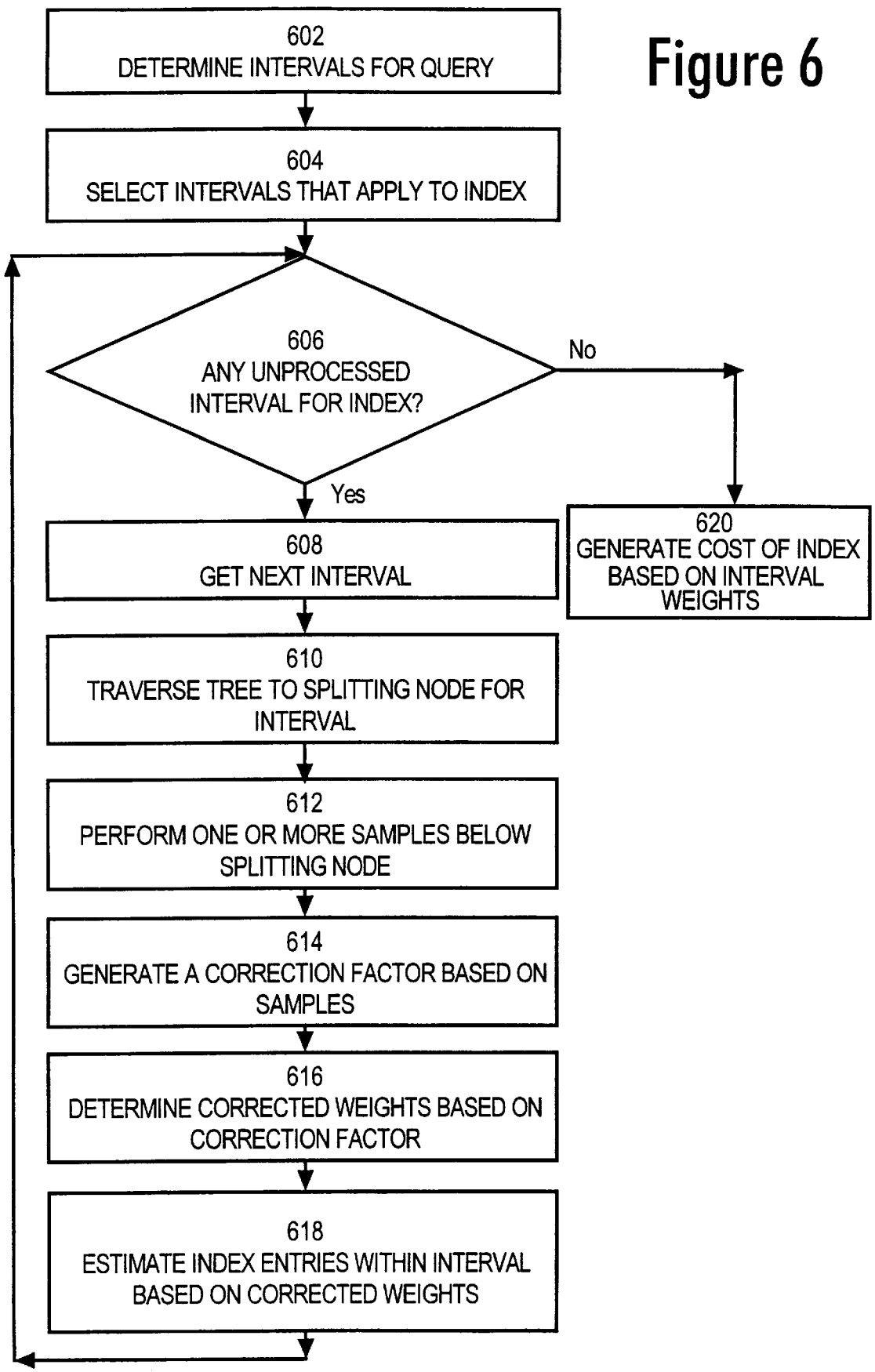
FIG. 6 is a flow chart that illustrates steps for determining the cost of using an index according to an embodiment of the invention.

FIG. 6 is a flow chart illustrating steps for estimating the cost of using an index to process a query according to an embodiment of the invention. At step 602, the query is examined to determine the intervals specified therein. At step 604, the intervals that apply to the index for which a cost estimation is being generated are selected. For example, if a query specifies ("ga"<col1<"qq") and ("ma"<col2<"zz"), and the index in question is only built on column "col2", then only the second interval ("ma"<col2<"zz") would apply to the index.

Steps 606 through 618 define a loop that is repeated for each of the applicable intervals. Within the loop, steps are performed for generating an estimate of the number of rowids for the currently selected interval. Specifically, at step 608, the next interval to be processed is selected.

At step 610, the tree is traversed until the splitting node for the selected interval is reached. At step 612, one or more samples are taken below the splitting node. As explained above, each sample operation retrieves weights that are used to determine a correction factor. At step 614, a correction factor is generated based on the samples taken. If multiple samples are taken, the correction factor for the interval may be generated by determining the average of the correction factors of each of the samples.

At step 616, the weights in the splitting node are adjusted based on the correction factor generated at step 614. At step 618, the number of rowids that fall within the interval is estimated based on the corrected weights. For example, assume that the interval is "bb"<col1<"ga", and that index 400 shown in FIG. 4 is built on col1. The splitting node for the interval in question would be node 406, since the value "bb" would lead down branch 426 and the value "ga" would lead down branch 430. Assume also that the sample was taken down branch 428, resulting in a correction factor of 5/2.

In the present example, branches 426 and 430 are associated with a partially contained interval, while branch 428 is associated with a filly contained interval. Consequently, before correction, the estimated number of entries within the target range would be (4/2+5+3/2), or 8.5. When divided by the correction factor, the corrected estimate is 3.4. The corrected estimate (3.4) is closer to the actual number of rowids within the target range (5) than the estimate without correction.

As mentioned above, the steps 606 to 618 for determining a corrected estimate are performed for each interval of the query that is applicable to the index. For example, if the query specifies ("c"<col1<"f") OR ("p"<col1), then the process would be repeated for the interval ("c", "f") and for the interval ("p", ∞).

When all of the intervals have been processed, control passes to step 620. At step 620, the cost of using the index is generated based on the corrected estimates for each of the intervals. For example, assume that three intervals apply to an index, and that the corrected estimates for the intervals are 5, 30 and 17. The estimated number of rowids that would be returned by the index would therefore be 52. The number of leaf nodes that would be visited if the index is used to process the query may be estimated to be 52 divided by the average number of rowids per leaf node.

Interval Classifcation

The cost estimation process described above requires the identification of intervals that contain values that satisfy criteria specified in a query (step 602). In general, queries include one or more Boolean expressions to identify target data. Based on the Boolean expressions specified in a query, the value space of an index may be divided into (1) intervals that contain values which would make the Boolean expression true ("T intervals"), and (2) intervals that contain values which would make the Boolean expression false ("F intervals").

In many cases, the identification of such intervals is straightforward. For example, if the query includes the Boolean expressions (c1>x) and (c1<y), then (x, y) is a T interval, and the intervals [−∞, x] and [y, +∞] are F intervals. However, when the Boolean expressions specified by a query are complex, it may be considered too expensive to determine whether a particular interval is a T or F interval. In these cases, the interval may be classified as a mixed or "M" interval.

Any techniques for identifying T and F intervals, or T, F and M intervals, may be used with the cost estimation techniques described herein. One technique, for finding T and F intervals is described, for example, in G. Antoshenkov, "Dynamic Optimization of Index Scans Restricted by Booleans", Proceedings 12th International Conference on Data Engineering, 1996.

According to one embodiment of the invention, the identification of intervals (step 602) is performed by inputting values into a Boolean evaluation function that returns the boundaries of the largest possible T and F intervals into which the values fall.

For example, assume that a query has the Boolean expression ("bb"<c1) AND (c1<"ga"). If the value "d" is input into the Boolean evaluation function for the query, the function outputs the interval ("bb", "ga") as a true interval. If the value "a" is input into the Boolean evaluation function, the function returns the interval (^, "bb") as a false interval. If the value "k" is input into the Boolean evaluation function, the interval ("ga", ∞) is returned as a false interval.

Once the T and F intervals for a query are determined, they are used to classify the intervals that are bounded by the keys that reside in the branch nodes to separate one branch from another ("separators"). Specifically, if two consecutive separators fall into the same T interval, then the interval bounded by the separators is a T interval. Similarly, if two consecutive separators fall into the same F interval, then the interval bounded by the separators is an F interval. When two consecutive separators do not fall into the same T or F interval, then the interval bounded by the separators is considered to be an M interval.

At each level, the rightmost branch nodes (e.g. nodes 404 and 408 in FIG. 4) implicitly include the separator ∞. Thus, branch node 404 contains the separators "^", "j", and ∞. The separator "^" falls into the F interval (^, "bb"). The separators "j" and ∞ both fall into the F interval ("ga", ∞).

Since the separators "^", "j" fall into different F intervals, the interval between "^" and "j" is classified as an M interval.

Since the separators "j" and ∞ fall into the same F interval, the interval between "j" and ∞ is classified as an M interval. Once an F interval is discovered it is excluded from further probing. Further probing may be done within M intervals to increase the accuracy of the interval designations. In the present example, the accuracy of the interval designations may be increased by following branch 422 associated with the M interval to branch node 406.

At node 406, the separator "^" falls into the F interval (^, "aa"), the separator "d" falls into the T interval ("aa", "ga"), the separator "f" falls into the T interval ("aa", "ga"). Implicitly, node 406 also includes the separator "j" which falls into the F interval ("ga", ∞).

After the evaluation of the separators in node 406, the intervals associated with the separators may be classified. Specifically, intervals bounded by separators that both fall into the T interval ("aa", "ga") are established as "T" intervals, intervals bounded by separators that both fall into the F interval ("ga", ∞) are established as "F" intervals, intervals bounded by separators that both fall into the F interval (^, "aa") are established as "F" intervals, and intervals bounded by separators that do not fall into the same T or F interval are established as "M" intervals.

Applying these classification rules to the separators in nodes 406 and 408, the interval [^, d) is an M interval, the interval [d, f) is a T interval, the interval [f, j) is an M interval.

As mentioned above, further probing may be done within M intervals to increase the accuracy of the interval designations. For example, branch 426, which leads to the values that fall into M interval [^, d) may be followed to node 410. Node 410 may be inspected to determine that "a" and "b" both fall within F interval (^, "bb") and "c" falls into the T interval ("bb", "ga"). Based on this information, M interval [^, d) and T interval [d, f) may be replaced with F interval [^, c) and T interval [c, f).

Similarly, branch 430, which leads to the values that fall into M interval [f, j) may be followed to node 414. The values in node 414 may be inspected to determine that "f" and "g" both fall into the T interval ("bb", "ga"), and "h" and "i" both fall into the F interval ("ga", ∞). Based on this information, M interval [f, j) and F interval [j, m) may be replaced with T interval [f, g] and F interval [h, m).

The two adjacent T intervals may then be merged to produce T interval [c, g]. The adjacent F intervals may be merged to produce F intervals [h, ∞]. The final set of intervals after the M intervals have been resolved are: F interval [^, c), T interval [c, g], and F interval [h, ∞].

According to one embodiment of the invention, probing continues down the branches associated with M intervals until either (1) all M intervals disappear, (2) a predefined I/O threshold is reached, or (3) the newly discovered intervals become too small compared to previously discovered T intervals.

Leaf Node Visit Estimation

As mentioned above, the number of nodes on the index that will be visited during use of the index may be estimated based on the estimate generated for the number of rowids that satisfy the search criteria. According to an alternative embodiment of the invention, an estimate for the number of leaf nodes that will be visited is generated based on leaf node estimates stored in branch nodes.

The leaf node estimates are similar to the rowid weight estimates described above in that the rowid weight estimate associated with a branch represents how many rowids are in the leaf nodes below the branch, while the leaf node estimate associated with a branch represents how many leaf nodes reside below the branch.

According to an embodiment of the invention, leaf node estimates are stored in branch nodes two or more levels above the leaf nodes. The leaf node estimates are read from those branch nodes that fall within each M or T interval. An estimate is generated for the number of leaf nodes that will be visited by the formula N=(M/2+T), where N is the number of leaf nodes that will be visited, M is the sum of the leaf node estimates for branches associated with M intervals, and T is the sum of the leaf node estimates for branches associated with T intervals.

These approximate values may be adjusted to increase the accuracy of the estimate using correction factors acquired by performing one or more sampling operations using the same sampling-based adjustment techniques described above. Specifically, one or more random samples may be taken beginning at a branch node that contains a leaf node estimate. The leaf node estimates associated with the branches that constitute the sampled path may be used to generate a correction factor that is used to adjust the leaf node estimate of the branch node at which the sampling operation was initiated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for estimating a cost of using a tree index to process a query that includes at least one interval restriction, the method comprising the steps of:

traversing the tree index to a node that has
      a first branch associated with a first interval into which a first endpoint of the interval restriction falls, and
      a second branch associated with a second interval into which a second endpoint of the interval restriction falls;

reading a first set of weight values associated with said first branch, said second branch, and any intervening branches that reside between said first branch and said second branch, wherein said first set of weight values represent statistics about information stored in said tree index below said first branch, said second branch, and any intervening branches; and estimating the cost of using said tree index based on said first set of weight values.

2. The method of claim 1 wherein:

said tree index is a pseudo-ranked tree;

said weight values are approximations of said statistics;

the method further includes the steps of:
      reading a second set of weight values associated with branches below said node by sampling said index tree below said node;
      generating a correction factor based on said second set of weight values; and
      adjusting said first set of weight values based on said correction factor to produce a corrected set of weight values; and said step of estimating the cost of using said tree index based on said first set of weight values includes the step of estimating the cost of using said tree index based on said corrected set of weight values.

3. The method of claim 2 wherein:
the method comprises the step of reading a third set of weight values associated with branches below said node by taking a second sample below said node; and
the step of generating a correction factor based on said second set of weight values includes the step of generating a correction factor based on said second set of weight values and said third set of weight values.

4. The method of claim 3 wherein the step of generating a correction factor based on said second set of weight values and said third set of weight values includes the steps of:
generating a first correction factor based on said second set of weight values;
generating a second a correction factor based on said third set of weight values; and
generating an average correction factor based on said first correction factor and said second correction factor.

5. The method of claim 2 wherein the step of reading a second set of weight values associated with branches below said node by sampling said index tree below said node includes the steps of:
selecting a first branch from said node;
descending said first branch to a second node; and
reading weight values associated with all branches extending from said second node, wherein said second set of weight values includes said weight values associated with all branches extending from said second node.

6. The method of claim 5 wherein the step of generating a correction factor based on said second set of weight values includes the steps of:
determining a ratio between the weight value of the first branch and a sum of the weight values associated with all branches extending from said second node; and
generating said correction factor based on said ratio.

7. The method of claim 6 wherein:
the step of reading a second set of weight values associated with branches below said node by sampling said index tree below said node includes the steps of:
selecting a second branch from said second node;
descending said second branch to a third node; and
reading weight values associated with all branches extending below said third node;
wherein the step of generating a correction factor based on said second set of weight values includes the steps of:
determining a second ratio between the weight value of the second branch and a sum of the weight values associated with all branches extending below said third node; and
averaging said ratio and said second ratio to generate an average ratio.

8. The method of claim 1 wherein:
said first set of weight values represent how many data item identifiers are stored in said tree index below said first branch, said second branch, and any intervening branches; and
the step of reading a first set of weight values associated with said first branch, said second branch, and any intervening branches that reside between said first branch and said second branch, includes the steps of
reading a first weight value that represents how many data item identifiers are stored in said tree below said first branch; and
reading a second weight value that represents how many data item identifiers are stored in said tree below said second branch.

9. The method of claim 1 further comprising the step of identifying an interval associated with said query by performing the steps of:
inspecting branch nodes that reside at a first level of the tree;
evaluating separators stored in said branch nodes based on said range limitation;
if any separators evaluate to true based on said range limitation, then
classifying all intervals between two separators that evaluate to true as T intervals;
classifying all intervals between two separators that evaluate to false as F intervals; and
classifying all intervals between a separator that evaluates to false and a separator that evaluates to true as an M interval.

10. The method of claim 9 further comprising the steps of:
selecting a branch that is associated with an M interval;
descending the branch to a lower branch node; and
evaluating separators in said lower branch node based on said range limitation.

11. A method for generating an estimate of how many data item identifiers stored in a tree index fall within a specified interval, the method comprising the steps of:
establishing weights for branches within said tree, wherein the weight value associated with each branch is an estimate of how many data item identifiers are stored in leaf nodes that reside below the branch;
reading a first weight value associated with a branch that corresponds to an interval that has at least one endpoint which falls within said specified interval;
following said branch to a second node;
reading a second set of weight values, wherein said second set of weight values are weight values associated with one or more branches that reside on a path that descends from said second node;
adjusting said first weight value based on said second set of weight values to produce an adjusted weight value; and
generating said estimate based on said adjusted weight value.

12. The method of claim 11 further comprising the steps of:
traversing the tree index to a node that has a first set of branches, said first set of branches including
a first branch associated with a first interval that bounds a first endpoint of the specified interval;
a second branch associated with a second interval that bounds a second endpoint of the specified interval; and
zero or more intervening branches that are associated with intervals between said first interval and said second interval; and
wherein said branch is a branch within said first set of branches.

13. The method of claim 11 further comprising the step of:
reading a third set of weight values, wherein said third set of weight values are weight values associated with one or more branches that reside on a second path that descends from said second node;
wherein the step of adjusting said first weight value based on said second set of weight values to produce an adjusted weight value includes the steps of:

generating a first correction ratio based on said first weight value and said second set of weight values;

generating a second correction ratio based on said first weight value and said third set of weight values;

generating an average correction ratio based on said first correction ratio and said second correction ratio; and adjusting said first weight value based on said average correction ratio.

14. The method of claim 11 wherein the step of reading a second set of weight values includes the steps of:

reading weight values associated with all branches extending from said second node;

generating a correction ratio based on said first weight value and a sum of the weight values associated with all branches extending from said second node; and wherein the step of adjusting said first weight value based on said second set of weight values includes the step of adjusting said first weight value based on said correction ratio.

15. The method of claim 14 wherein the step of reading a second set of weight values further includes the steps of:

selecting a second branch that extends from said second node;

reading a second weight value associated with said second branch;

descending said second branch to a third node;

reading weight values associated with all branches extending from said third node;

generating a second correction ratio based on said second weight and a sum of the weight values associated with all branches extending from said third node;

generating a correction factor based on said correction ratio and said second correction ratio; and wherein the step of adjusting said first weight value based on said second set of weight values includes the step of adjusting said first weight value based on said correction factor.

16. A computer-readable medium having stored thereon sequences of instructions for estimating a cost of using a tree index to process a query that includes at least one interval restriction, the sequences of instructions including instructions for performing the steps of:

traversing the tree index to a node that has
a first branch associated with a first interval into which a first endpoint of the interval restriction falls, and
a second branch associated with a second interval into which a second endpoint of the interval restriction falls;

reading a first set of weight values associated with said first branch, said second branch, and any intervening branches that reside between said first branch and said second branch, wherein said first set of weight values represent statistics about information stored in said tree index below said first branch, said second branch, and any intervening branches; and estimating the cost of using said tree index based on said first set of weight values.

17. The computer-readable medium of claim 16 wherein:

said tree index is a pseudo-ranked tree;

said weight values are approximations of said statistics;

the sequences of instructions further include instructions for performing the steps of:

reading a second set of weight values associated with branches below said node by sampling said index tree below said node;

generating a correction factor based on said second set of weight values; and adjusting said first set of weight values based on said correction factor to produce a corrected set of weight values; and said step of estimating the cost of using said tree index based on said first set of weight values includes the step of estimating the cost of using said tree index based on said corrected set of weight values.

18. The computer-readable medium of claim 17 wherein:

the sequences of instructions further comprise instructions for performing the step of reading a third set of weight values associated with branches below said node by taking a second sample below said node; and the step of generating a correction factor based on said second set of weight values includes the step of generating a correction factor based on said second set of weight values and said third set of weight values.

19. The computer-readable medium of claim 18 wherein the step of generating a correction factor based on said second set of weight values and said third set of weight values includes the steps of:

generating a first correction factor based on said second set of weight values;

generating a second a correction factor based on said third set of weight values; and generating an average correction factor based on said first correction factor and said second correction factor.

20. The method of claim 17 wherein the step of reading a second set of weight values associated with branches below said node by sampling said index tree below said node includes the steps of:

selecting a first branch from said node;

descending said first branch to a second node; and reading weight values associated with all branches extending from said second node, wherein said second set of weight values includes said weight values associated with all branches extending from said second node.

21. The computer-readable medium of claim 20 wherein the step of generating a correction factor based on said second set of weight values includes the steps of:

determining a ratio between the weight value of the first branch and a sum of the weight values associated with all branches extending from said second node; and generating said correction factor based on said ratio.

22. The computer-readable medium of claim 21 wherein:

the step of reading a second set of weight values associated with branches below said node by sampling said index tree below said node includes the steps of:

selecting a second branch from said second node;

descending said second branch to a third node; and reading weight values associated with all branches extending below said third node;

wherein the step of generating a correction factor based on said second set of weight values includes the steps of:

determining a second ratio between the weight value of the second branch and a sum of the weight values associated with all branches extending below said third node; and averaging said ratio and said second ratio to generate an average ratio.

23. The computer-readable medium of claim 16 wherein:

said first set of weight values represent how many data item identifiers are stored in said tree index below said first branch, said second branch, and any intervening branches; and the step of reading a first set of weight values associated with said first branch, said second branch, and any intervening branches that reside between said first branch and said second branch, includes the steps of reading a first weight value that represents how many data item identifiers are stored in said tree below said first branch; and reading a second weight value that represents how many data item identifiers are stored in said tree below said second branch.

24. The computer-readable medium of claim 16 further comprising sequences of instructions for performing the step of identifying an interval associated with said query by performing the steps of:

inspecting branch nodes that reside at a first level of the tree;

evaluating separators stored in said branch nodes based on said range limitation;

if any separators evaluate to true based on said range limitation, then classifying all intervals between two separators that evaluate to true as T intervals;

classifying all intervals between two separators that evaluate to false as F intervals; and classifying all intervals between a separator that evaluates to false and a separator that evaluates to true as an M interval.

25. The computer-readable medium of claim 24 further comprising sequences of instructions for performing the steps of:

selecting a branch that is associated with an M interval;

descending the branch to a lower branch node; and evaluating separators in said lower branch node based on said range limitation.

26. A computer system comprising:

one or more memory devices;

a tree index stored in said one or more memory devices;

a processor coupled to said one or more memory devices;

a sequence of instructions stored in said one or more memory devices for estimating a cost of using a tree index to process a query that includes at least one interval restriction, the sequences of instructions including instructions which, when executed by said processor, cause said processor to perform the steps of:

traversing the tree index to a node that has a first branch associated with a first interval into which a first endpoint of the interval restriction falls, and a second branch associated with a second interval into which a second endpoint of the interval restriction falls;

reading a first set of weight values associated with said first branch, said second branch, and any intervening branches that reside between said first branch and said second branch, wherein said first set of weight values represent statistics about information stored in said tree index below said first branch, said second branch, and any intervening branches; and estimating the cost of using said tree index based on said first set of weight values.

27. The computer system of claim 26 wherein:

said tree index is a pseudo-ranked tree;

said weight values are approximations of said statistics;

the sequences of instructions further include instructions for performing the steps of:

reading a second set of weight values associated with branches below said node by sampling said index tree below said node;

generating a correction factor based on said second set of weight values; and adjusting said first set of weight values based on said correction factor to produce a corrected set of weight values; and said step of estimating the cost of using said tree index based on said first set of weight values includes the step of estimating the cost of using said tree index based on said corrected set of weight values.

28. The computer system of claim 27 wherein:

the sequences of instructions further comprise instructions for performing the step of reading a third set of weight values associated with branches below said node by taking a second sample below said node; and the step of generating a correction factor based on said second set of weight values includes the step of generating a correction factor based on said second set of weight values and said third set of weight values.

29. The computer system of claim 28 wherein the step of generating a correction factor based on said second set of weight values and said third set of weight values includes the steps of:

generating a first correction factor based on said second set of weight values;

generating a second a correction factor based on said third set of weight values; and generating an average correction factor based on said first correction factor and said second correction factor.

30. A computer system comprising:

one or more memory devices;

a tree index stored in said one or more memory devices;

a processor coupled to said one or more memory devices, said processor being configured to generate an estimate of how many data item identifiers stored in said tree index fall within a specified interval by executing the steps of:

establishing weights for branches within said tree, wherein the weight value associated with each branch is an estimate of how many data item identifiers are stored in leaf nodes that reside below the branch;

reading a first weight value associated with a branch that corresponds to an interval that has at least one endpoint which falls within said specified interval;

following said branch to a second node;

reading a second set of weight values, wherein said second set of weight values are weight values associated with one or more branches that reside on a path that descends from said second node;

adjusting said first weight value based on said second set of weight values to produce an adjusted weight value; and generating said estimate based on said adjusted weight value.

31. The computer system of claim 30 wherein the processor is further configured to execute the steps of:

traversing the tree index to a node that has a first set of branches, said first set of branches including a first branch associated with a first interval that bounds a first endpoint of the specified interval;

a second branch associated with a second interval that bounds a second endpoint of the specified interval; and zero or more intervening branches that are associated with intervals between said first interval and said second interval; and wherein said branch is a branch within said first set of branches.

32. The computer system of claim 30 wherein the processor is further configured to execute the step of:

reading a third set of weight values, wherein said third set of weight values are weight values associated with one or more branches that reside on a second path that descends from said second node;

wherein the step of adjusting said first weight value based on said second set of weight values to produce an adjusted weight value includes the steps of:

generating a first correction ratio based on said first weight value and said second set of weight values;

generating a second correction ratio based on said first weight value and said third set of weight values;

generating an average correction ratio based on said first correction ratio and said second correction ratio; and adjusting said first weight value based on said average correction ratio.

\* \* \* \* \*